United States Patent
Takagi et al.

(10) Patent No.: US 11,989,663 B2
(45) Date of Patent: May 21, 2024

(54) PREDICTION METHOD, PREDICTION APPARATUS, AND COMPUTER-READABLE RECORDING MEDIUM

(71) Applicant: FUJITSU LIMITED, Kawasaki (JP)

(72) Inventors: Takuya Takagi, Kawasaki (JP); Hiroaki Iwashita, Tama (JP); Keisuke Goto, Kawasaki (JP); Kotaro Ohori, Chuo (JP)

(73) Assignee: FUJITSU LIMITED, Kawasaki (JP)

( * ) Notice: Subject to any disclaimer, the term of this patent is extended or adjusted under 35 U.S.C. 154(b) by 373 days.

(21) Appl. No.: 16/904,305

(22) Filed: Jun. 17, 2020

(65) Prior Publication Data

US 2021/0004698 A1    Jan. 7, 2021

(30) Foreign Application Priority Data

Jul. 5, 2019   (JP) ................. 2019-126209

(51) Int. Cl.
  *G06N 5/04*    (2023.01)
  *G06N 5/01*    (2023.01)
  *G06N 20/00*   (2019.01)

(52) U.S. Cl.
  CPC ......... *G06N 5/04* (2013.01); *G06N 5/01* (2023.01); *G06N 20/00* (2019.01)

(58) Field of Classification Search
  None
  See application file for complete search history.

(56) References Cited

U.S. PATENT DOCUMENTS 6,018,738 A *  1/2000  Breese ............ G06Q 30/06
                                         707/999.005
6,301,579 B1*  10/2001 Becker ........... G06F 16/287
                                         707/999.102

(Continued)

FOREIGN PATENT DOCUMENTS

WO   WO 2019/088972 A1   5/2019

OTHER PUBLICATIONS

Paulo "A Data Structure to Represent Association Rules based Classifiers", 12/200, pp. 1-6 (Year: 2001).*

(Continued)

*Primary Examiner* — Romain Jeanty
(74) *Attorney, Agent, or Firm* — STAAS & HALSEY LLP

(57) ABSTRACT

A non-transitory computer-readable recording medium stores therein a prediction program that causes a computer to execute a process including receiving input data to be predicted, generating a tree structure data based on a plurality of pieces of rule information each indicated by an association of a combination of attribute values of a plurality of attributes with a label according to a predetermined order condition for the plurality of attributes, the tree structure data being obtained by aggregating the plurality of pieces of rule information, the tree structure data including an attribute value as a branch, and determining a degree of contribution to make a determination result on a predetermined value of a predetermined attribute reach a predetermined label based on a likelihood of obtaining a value of the predetermined label as the determination result, when the attribute value of the predetermined attribute is determined to be the predetermined value.

9 Claims, 20 Drawing Sheets

(56) References Cited

U.S. PATENT DOCUMENTS

| | | | | |
|---|---|---|---|---|
| 2006/0064313 | A1* | 3/2006 | Steinbarth | G06Q 10/1057 |
| | | | | 705/322 |
| 2010/0199167 | A1* | 8/2010 | Uematsu | G06F 40/143 |
| | | | | 715/234 |
| 2016/0313651 | A1* | 10/2016 | Middlebrooks | G06F 30/367 |
| 2019/0080483 | A1* | 3/2019 | Mammou | H04N 19/593 |
| 2019/0188551 | A1 | 6/2019 | Katz et al. | |
| 2020/0401113 | A1* | 12/2020 | Yuan | G05B 19/41865 |

OTHER PUBLICATIONS

H.D.N. Harshika et al (An Approach for Extracting and Predicting Instance-specific Attribute Values from E-commerce Sites for Used Products); Dec. 2017; International Journal of Smart Computing and Artificial Intelligence International Institute of Applied Informatics, vol. 1, No. 2, p. 41-57 (Year: 2017).*

Leo Breiman, "Random Forests"; Statistics Department, University of California, Berkeley, CA 94720; Machine Learning, 45, 5-32, 2001; (28 pages).

Extended European Search Report dated Dec. 16, 2020 in related European Patent Application No. 20180502.5 (9 pages).

* cited by examiner

| | A | B | C | D | H1 | H2 | H3 | H4 | H5 | H6 | H7 | H8 | H9 | H10 | H11 |
|---|---|---|---|---|---|---|---|---|---|---|---|---|---|---|---|
| | | | | | C | CD | BD | BD | BC | BD | AD | AB | AB | AD | AC |
| | | | | | + | − | − | + | − | + | + | + | − | − | − |
| $N_1$ | 0 | 0 | 0 | 0 | 1 | 0 | 1 | 0 | 0 | 0 | 0 | 0 | 1 | 0 | 0 |
| $N_2$ | 0 | 0 | 0 | 1 | 1 | 0 | 0 | 0 | 0 | 0 | 1 | 0 | 1 | 0 | 0 |
| $P_1$ | 0 | 0 | 1 | 0 | 0 | 1 | 1 | 0 | 1 | 0 | 0 | 0 | 0 | 0 | 0 |
| $IN_3$ | 0 | 0 | 1 | 1 | 0 | 1 | 0 | 1 | 1 | 1 | 1 | 1 | 0 | 0 | 0 |
| $IN_1$ | 0 | 1 | 0 | 0 | 1 | 0 | 0 | 0 | 0 | 0 | 0 | 1 | 0 | 1 | 0 |
| $P_2$ | 0 | 1 | 0 | 1 | 0 | 1 | 0 | 0 | 1 | 1 | 0 | 1 | 0 | 1 | 0 |
| $P_3$ | 1 | 0 | 0 | 0 | 1 | 0 | 1 | 1 | 0 | 0 | 0 | 0 | 0 | 0 | 1 |
| $N_2$ | 1 | 0 | 0 | 1 | 0 | 0 | 1 | 0 | 1 | 0 | 0 | 0 | 0 | 1 | 1 |
| $P_4$ | 1 | 1 | 1 | 0 | 0 | 1 | 0 | 1 | 0 | 1 | 0 | 0 | 0 | 1 | 0 |
| $N_3$ | 1 | 1 | 1 | 1 | 1 | 0 | 0 | 0 | 0 | 0 | 0 | 0 | 0 | 0 | 1 |

FIG.13
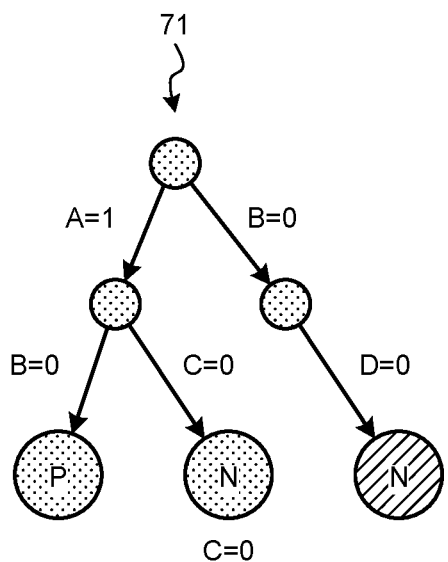
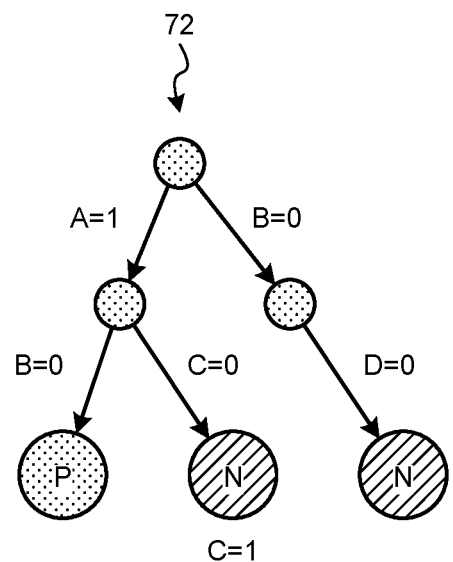

PREDICTION METHOD, PREDICTION APPARATUS, AND COMPUTER-READABLE RECORDING MEDIUM

CROSS-REFERENCE TO RELATED APPLICATION

This application is based upon and claims the benefit of priority of the prior Japanese Patent Application No. 2019-126209, filed on Jul. 5, 2019, the entire contents of which are incorporated herein by reference.

FIELD

The embodiments discussed herein are related to a prediction program, a prediction method, and a prediction apparatus.

BACKGROUND

As a technology used for nonlinear classification of discrete data, there is a technology of performing machine learning on a classification rule used to classify data using supervised training data, that is, a decision tree, and predicting the classification result of input data using the learned decision tree.

Non-Patent Document 1: L. Breiman, Machine Learning, vol. 45, pp. 5-32 (2001)

SUMMARY

According to an aspect of the embodiments, a non-transitory computer-readable recording medium stores therein a prediction program that causes a computer to execute a process including: receiving input data to be predicted; generating a tree structure data based on a plurality of pieces of rule information each indicated by an association of a combination of attribute values of a plurality of attributes with a label according to a predetermined order condition for the plurality of attributes, the tree structure data being obtained by aggregating the plurality of pieces of rule information, the tree structure data including an attribute value as a branch; and determining a degree of contribution to make a determination result on a predetermined value of a predetermined attribute reach a predetermined label based on a likelihood of obtaining a value of the predetermined label as the determination result, when the attribute value of the predetermined attribute among the plurality of attributes in the tree structure data is determined to be the predetermined value based on the input data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram illustrating an example of training data;

FIG. 8 is an explanatory diagram for explaining a hypothesis that matches input data;

FIG. 13 is an explanatory diagram exemplifying a degree of contribution;

DESCRIPTION OF EMBODIMENTS

Figure 1:
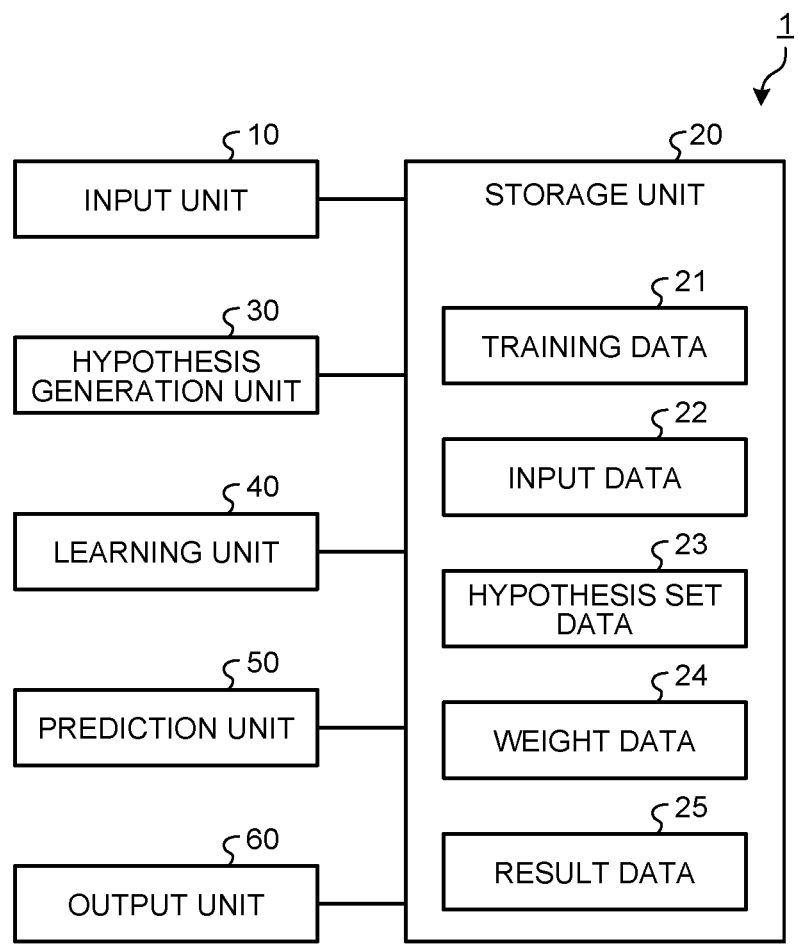
FIG. 1 is a block diagram illustrating a functional configuration example of an information processing apparatus according to an embodiment.

One of the purposes of the prediction of the input data is to specify (predict) optimal actions (for example, how to control the next process in the manufacturing process, what action needs to be performed subsequently for the customer to be marketed, and the like) using the classification rule.

However, a plurality of classification rules for prediction may be generated. For this reason, the above-described related technology has a problem in that upon predicting the optimal actions, all of the actions based on each of the plurality of classification rules are tried (on round robin basis), and the processing cost is increased.

Accordingly, it is an object in one aspect of an embodiment of the invention to provide a prediction program, a prediction method, and a prediction apparatus that can efficiently perform prediction of input data.

Preferred embodiments will be explained with reference to accompanying drawings. In the embodiments, configurations having the same functions are denoted by the same reference numerals, and redundant description thereof will be omitted. Note that the prediction program, the prediction method, and the prediction apparatus described in the following embodiments are merely examples, and the embodiments are not limited. In addition, each of the following embodiments may be appropriately combined within a range not inconsistent.

FIG. 1 is a block diagram illustrating a functional configuration example of an information processing apparatus according to an embodiment.

As illustrated in FIG. 1, an information processing apparatus 1 includes an input unit 10, a storage unit 20, a hypothesis generation unit 30, a learning unit 40, a prediction unit 50, and an output unit 60.

The input unit 10 is a processing unit that receives inputs of various data such as training data 21 related to machine learning and input data 22 to be predicted. The input unit 10 stores the training data 21 or the input data 22, which are received as the input, in the storage unit 20.

The storage unit 20 stores various data such as the training data 21, the input data 22, hypothesis set data 23, weight data 24, and result data 25.

The hypothesis generation unit 30 comprehensively searches for each hypothesis (rules (grounds) explaining that prediction is made based on objective variables) that includes a combination of explanatory variables from the training data 21 having the explanatory variables and the objective variables.

Next, the hypothesis generation unit 30 classifies any of the training data 21 based on the explanatory variables and the objective variables of the training data 21 for each of the searched hypotheses, and specifies a hypothesis that satisfies a specific condition. Here, the specific condition is that the number or ratio of training data 21 classified into a predetermined class by a rule indicated by a hypothesis (combination of the explanatory variables) is equal to or greater than a predetermined value. For example, the hypothesis generation unit 30 specifies, based on a certain number or more of samples and (or) a certain ratio or more of samples, the searched hypothesis that explains that the number or ratio of training data 21 classified by the hypothesis is equal to or greater than the predetermined value and the classification result by the hypothesis belongs to a certain class. That is, the hypothesis generation unit 30 specifies hypotheses that may correctly explain that the prediction is made based on the objective variables of the training data 21.

Next, the hypothesis generation unit 30 adds the specified hypothesis to a hypothesis set. In this way, the hypothesis generation unit 30 lists, in the hypothesis set, the hypotheses that may correctly explain that the prediction is made based on the objective variables of the training data 21. Next, the hypothesis generation unit 30 stores the hypothesis set data 23 indicating the hypothesis set listing the hypotheses in the storage unit 20. Each hypothesis listed in this hypothesis set is an example of a plurality of pieces of rule information, each of which is indicated by an association of a combination of attribute values of a plurality of attributes (combination of explanatory variables) with a label (object variable).

The learning unit 40 performs learning to calculate weights of each of the plurality of hypotheses based on whether or not each of the plurality of hypotheses included in the hypothesis set of the hypothesis set data 23 is established for each training data 21. The learning unit 40 stores, as weight data 24, the weights of each of the plurality of hypotheses obtained by a learning result in the storage unit 20. The hypothesis set data 23 and the weight data 24 obtained in this way are a prediction model for obtaining a prediction result.

The prediction unit 50 is the processing unit that generates the prediction result based on the input data 22 to be predicted using the hypothesis set based on the hypothesis set data 23 and the weights of the plurality of hypotheses based on the weight data 24, that is, the prediction model. The prediction unit 50 stores, as result data 25, the generated prediction result in the storage unit 20.

The input data 22 includes, for example, the known action (a part of the explanatory variable) and a targeted label (objective variable). For the unknown action (remaining explanatory variable), the prediction unit 50 predicts an optimal explanatory variable value that is the targeted label after the known action is performed, that is, an optimal action using the hypothesis set based on the hypothesis set data 23 and the prediction model.

For example, in the manufacturing process, in the case of predicting how to control the next process in order to manufacture non-defective products, the known action included in the input data 22 includes an observation value, a control setting value, or the like in the manufacturing process. In addition, the targeted label includes one indicating that products manufactured in the manufacturing process are non-defective products. Thereby, the prediction unit 50 can predict how to control the next process (unknown action) to manufacture a non-defective product.

In addition, for example, in the case of predicting what action needs to be performed subsequently for a customer for successful marketing, the known actions included in the input data 22 include reception contents to a user in marketing. In addition, the targeted label includes one indicating that marketing is successful. Thereby, the prediction unit 50 can predict what action (unknown action) needs to be performed subsequently for the customer for successful marketing.

Specifically, the prediction unit 50 is data obtained by aggregating each hypothesis listed in the hypothesis set according to a predetermined order condition for the plurality of attributes based on the hypothesis set data 23, and generates tree structure data that includes an attribute value (explanatory variable value) as a branch.

It is assumed that an order condition of a plurality of attributes is set in advance as user setting in a rule base or the input data 22. Specifically, an order (for example, A→B→C→ . . . ) corresponding to a process order and the like in the manufacturing process is set in advance for a plurality of attributes. Therefore, the prediction unit 50 generates the tree structure data having, as the branch, the attribute values such as the observation value or the control setting value in the manufacturing process in the order corresponding to the process order and the like in the manufacturing process.

Next, the prediction unit 50 searches for an optimal explanatory variable value that is the targeted label after the known action included in the input data 22 is performed, that is, the optimal action using the tree structure indicated by the generated tree structure data. Specifically, when an attribute value of a predetermined attribute among a plurality of attributes in the tree structure data is determined to be a predetermined value based on the input data 22, the prediction unit 50 determines a degree of contribution to make the predetermined value of the predetermined attribute reach a predetermined label based on a likelihood (for example, prediction score) of obtaining a value of a predetermined label as the determination result of the prediction model. Next, the prediction unit 50 searches for the attribute value in the predetermined attribute based on the determined degree of contribution. Specifically, the value that makes the degree of contribution higher is set as the attribute value in the predetermined attribute.

For example, the prediction unit 50 performs pruning by applying the known attribute value included in the input data 22 to the tree structure data. Next, the prediction unit 50 determines the degree of contribution to the fact that for the attribute whose attribute value is unknown among the plurality of attributes, the determination result when the unknown attribute value of the attribute is determined to be the predetermined value is the label included in the input data 22. Next, the prediction unit 50 searches for the attribute value in the unknown attribute based on the determined degree of contribution. For example, a method of making a degree of contribution higher by allowing the prediction unit 50 to compare the degree of contribution determined based on the branch having attribute value 0 based on the tree structure data with the degree of contribution determined based on the branch having attribute value 1 based on the tree structure data is sought.

The output unit 60 is a processing unit that reads out the result data 25 stored in the storage unit 20 and outputs the read result data 25 to a display, a file, or the like. Thereby, the information processing apparatus 1 outputs the prediction result predicted by the prediction unit 50 to the display, the file, or the like. Specifically, the information processing apparatus 1 outputs the prediction result of the optimal action predicted by the prediction unit 50.

As described above, the information processing apparatus 1 is an example of a learning apparatus and a prediction apparatus. In the present embodiment, a configuration in which one information processing apparatus 1 performs learning and prediction in an integrated manner is illustrated, but a separate information processing apparatus 1 may realize the learning and the prediction.

Figure 2:
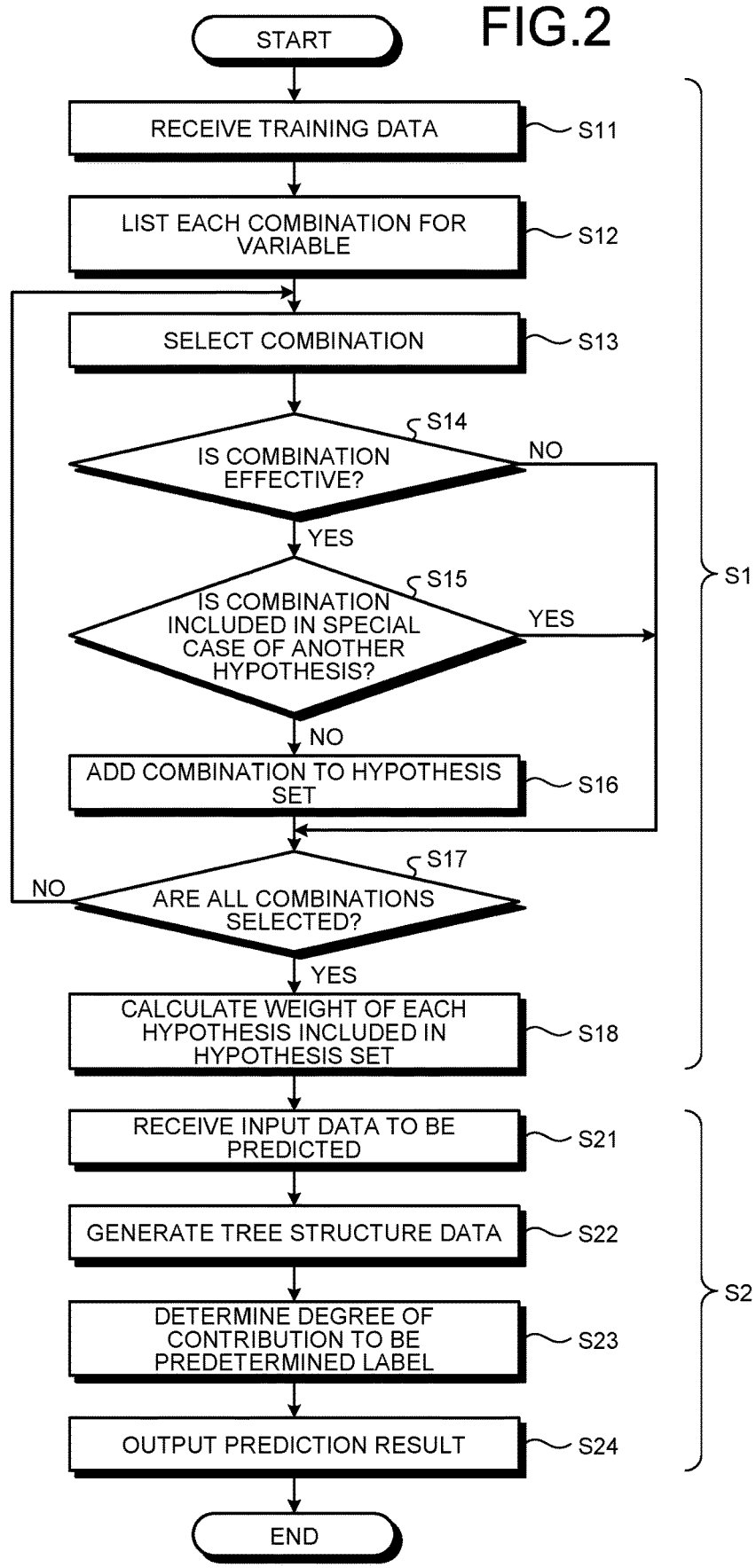
FIG. 2 is a flowchart illustrating an operation example of the information processing apparatus according to the embodiment.

Next, the processing of each of the above functional units will be described in detail while illustrating an operation example of the information processing apparatus 1. FIG. 2 is a flowchart illustrating an operation example of the information processing apparatus 1 according to the embodiment.

As illustrated in FIG. 2, the operation of the information processing apparatus 1 includes an operation (S1) at the time of learning for generating a prediction model and a prediction operation (S2) of obtaining the prediction result by applying the generated prediction model to the input data 22 to be predicted. First, the operation (S1) during the learning will be described.

As illustrated in FIG. 2, when the processing is started, the input unit 10 receives the input of the training data 21 (S11) and stores the input in the storage unit 20.

Figure 3:
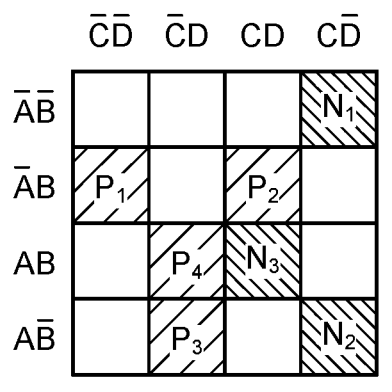

FIG. 3 is an explanatory diagram illustrating an example of the training data. The training data 21 is supervised data for each of a plurality of cases, and includes explanatory variables A to D that explain properties of data and an objective variable that is a classification result (correct answer information) into + or −.

As illustrated in FIG. 3, training data ($P_1$ to $P_4$ and $N_1$ to $N_3$) include explanatory variables A to D (information used for prediction) which explain the properties of the data, and objective variables (information to be predicted) which are the correct answer information indicating class (classification) into + or −. For example, the training data $P_1$ to $P_4$ are data in which the objective variables A to D each are 0 or 1, and are classified into +. Similarly, the training data $N_1$ to $N_3$ are data in which the objective variables A to D each are 0 or 1, and are classified into −.

For example, in the field of the manufacturing process, in the case of the training data ($P_1$ to $P_4$ and $N_1$ to $N_3$) for generating a prediction model that classifies the result (non-defective product/defective product) of a manufactured product from process data, the explanatory variables A to D correspond to observation values, control values, and the like for each process. In addition, the objective variable corresponds to a manufacturing result such as a non-defective product (P)/defective product (N).

The explanatory variable (I/O) is represented by presence or absence of an overline (hereinafter, referred to as a "bar"). For example, A indicates A=1, and A bar indicates A=0. In addition, the object variable (+/−) is represented by a shaded pattern. For example, a shaded pattern of the training data $P_1$ to $P_4$ indicates that the objective variable is +. In addition, a shaded pattern of the training data $N_1$ to $N_3$ indicates that the objective variable is −. Note that these representations are common to other drawings.

Next, the hypothesis generation unit 30 comprehensively lists combinations of possible values (unused=*, value=1, value=0) for each of the explanatory variables included in the training data ($P_1$ to $P_4$ and $N_1$ to $N_3$), that is, hypotheses (S12).

Note that the number of combined explanatory variables may be limited (conditioned) to be equal to or less than a predetermined number. For example, in the case of four explanatory variables A to D, the number of explanatory variables to be combined may be limited to two or less (at least two of the four explanatory variables that are "unused=*" are combined). Thereby, it is possible to suppress the increase in the number of combinations in advance.

Next, the hypothesis generation unit 30 selects a predetermined combination from the combinations listed in S12 (S13). Next, the hypothesis generation unit 30 classifies the selected combination as any of the training data ($P_1$ to $P_4$ and $N_1$ to $N_3$) and determines whether the selected combination is an effective combination that meets specific conditions, based on the explanatory variables and the objective variables of the training data ($P_1$ to $P_4$ and $N_1$ to $N_3$) (14).

Figure 4:
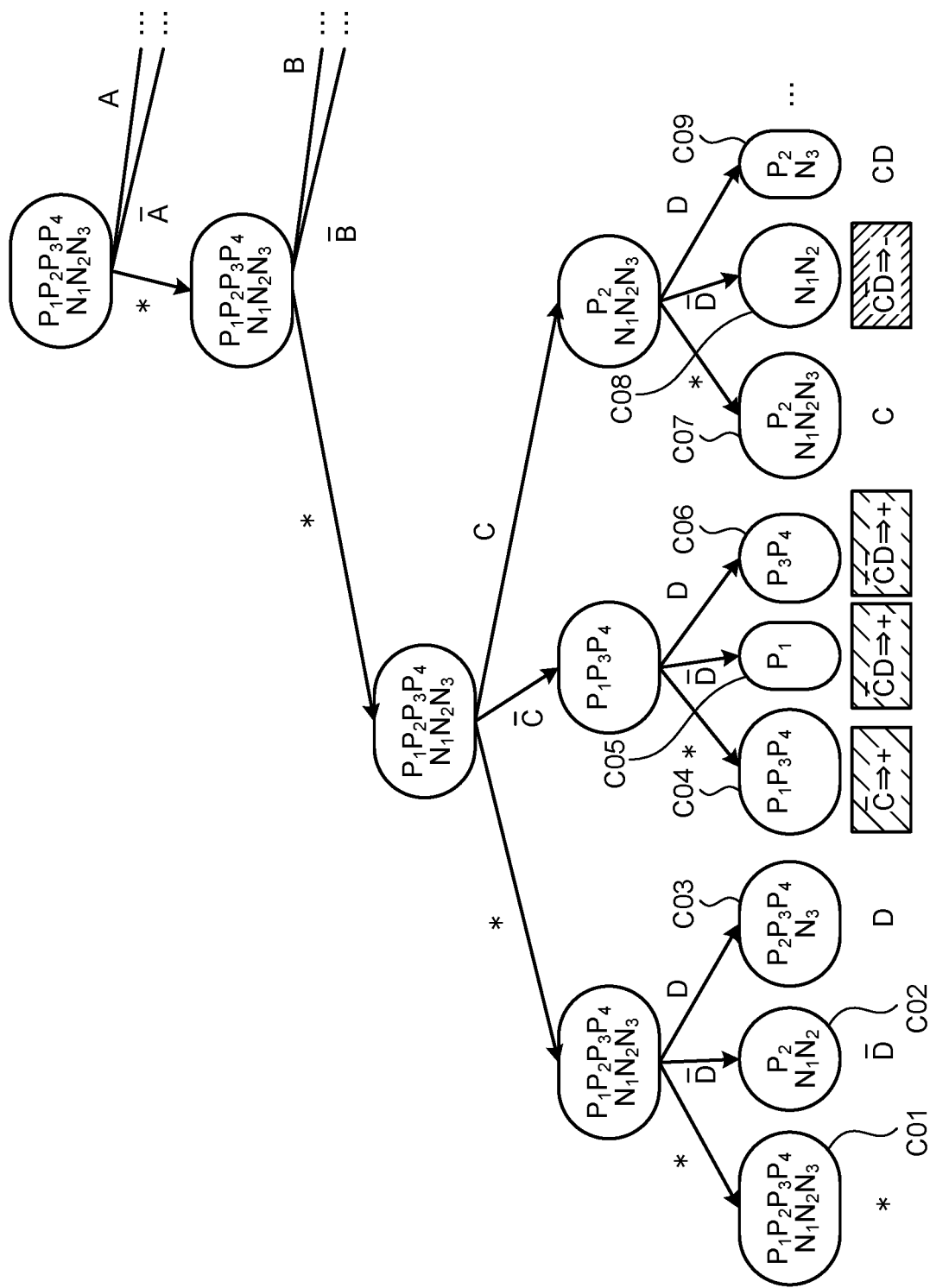
FIG. 4 is an explanatory diagram for explaining a generation of a hypothesis.

FIG. 4 is an explanatory diagram illustrating a generation of a hypothesis. FIG. 4 illustrates, as an example, a combination C01 in which all of the four explanatory variables A to D are "*" to a combination C09 which is CD (AB is "*").

As illustrated in FIG. 4, the hypothesis generation unit 30 lists the training data ($P_1$ to $P_4$ and $N_1$ to $N_3$) corresponding to hypotheses (rules) of each of the combinations C01 to C09 based on the explanatory variables of the training variables ($P_1$ to $P_4$ and $N_1$ to $N_3$).

For example, a rule of a D bar (the remaining three explanatory variables are "unused=*") of the combination C02 corresponds to the training data $P_2$, $N_1$, and $N_2$. In the rule (D bar) of this combination C02, the training data ($P_2$) whose objective variable is + and the training data ($N_1$ and $N_2$) whose objective variable is − are mixed. Therefore, the combination C02 is unlikely to be a hypothesis that correctly explains that the combination is classified into a certain class, and is not an effective combination.

Here, the training data ($P_1$, $P_3$, and $P_4$) in which the objective variable is + corresponds to the rule (C bar) of the combination C04. That is, the combination C04 is highly likely to be a rule that correctly explains that the number or ratio of training data ($P_1$, $P_3$, and $P_4$) classified into the + class is equal to or greater than the predetermined value and the classification into the + class is made. Therefore, the hypothesis generation unit 30 determines that the combination C04 (C bar) is an effective combination (hypothesis) classified into the + class. Similarly, the hypothesis generation unit 30 also determines that the combinations C05 and C06 are the effective combination (hypothesis) classified into the + class.

In addition, the rule (CD bar) of the combination C08 corresponds to the training data ($N_1$ and $N_2$) whose objective variable is −. That is, the combination C08 is highly likely to be a rule that correctly explains that the number or ratio of training data ($N_1$ and $N_2$) classified into the − class is equal to or greater than the predetermined value and the classification into the − class is made. Therefore, the hypothesis generation unit 30 determines that the combination C08 (CD bar) is an effective combination (hypothesis) classified into the − class.

The number or ratio of training data ($P_1$ to $P_4$ and $N_1$ to $N_3$) classified into a predetermined class, which is a condition for determining an effective combination, may be set arbitrarily. For example, since noise may be mixed in the training data, the training data may be set to allow a predetermined number of classes (for example, −) opposite to the predetermined class (for example, +).

As an example, when noise corresponding to one training data is allowed, the combination C03 (D) is determined to be the effective combination (hypothesis) classified into the + class. Similarly, the combination C07 (C) is determined to be the effective combination (hypothesis) classified into the − class.

Referring back to FIG. 2, if the combination is not effective (S14: NO), the hypothesis generation unit 30 proceeds to S17 without adding the selected combination to the hypothesis set.

If the combination is effective (S14: YES), the hypothesis generation unit 30 determines whether the selected combination is a special case of another hypothesis included in the hypothesis set (S15).

For example, the C bar D of the combination C05 and the C bar D bar of the combination C06 in FIG. 4 are formed by adding a new literal to the C bar of the combination C04. The hypothesis generation unit 30 determines that such combinations C05 and C06 are a special case of the C bar of the combination C04.

If it is the special case (S15: YES), the hypothesis generation unit 30 proceeds to S17 without adding the selected combination to the hypothesis set.

Figure 5:
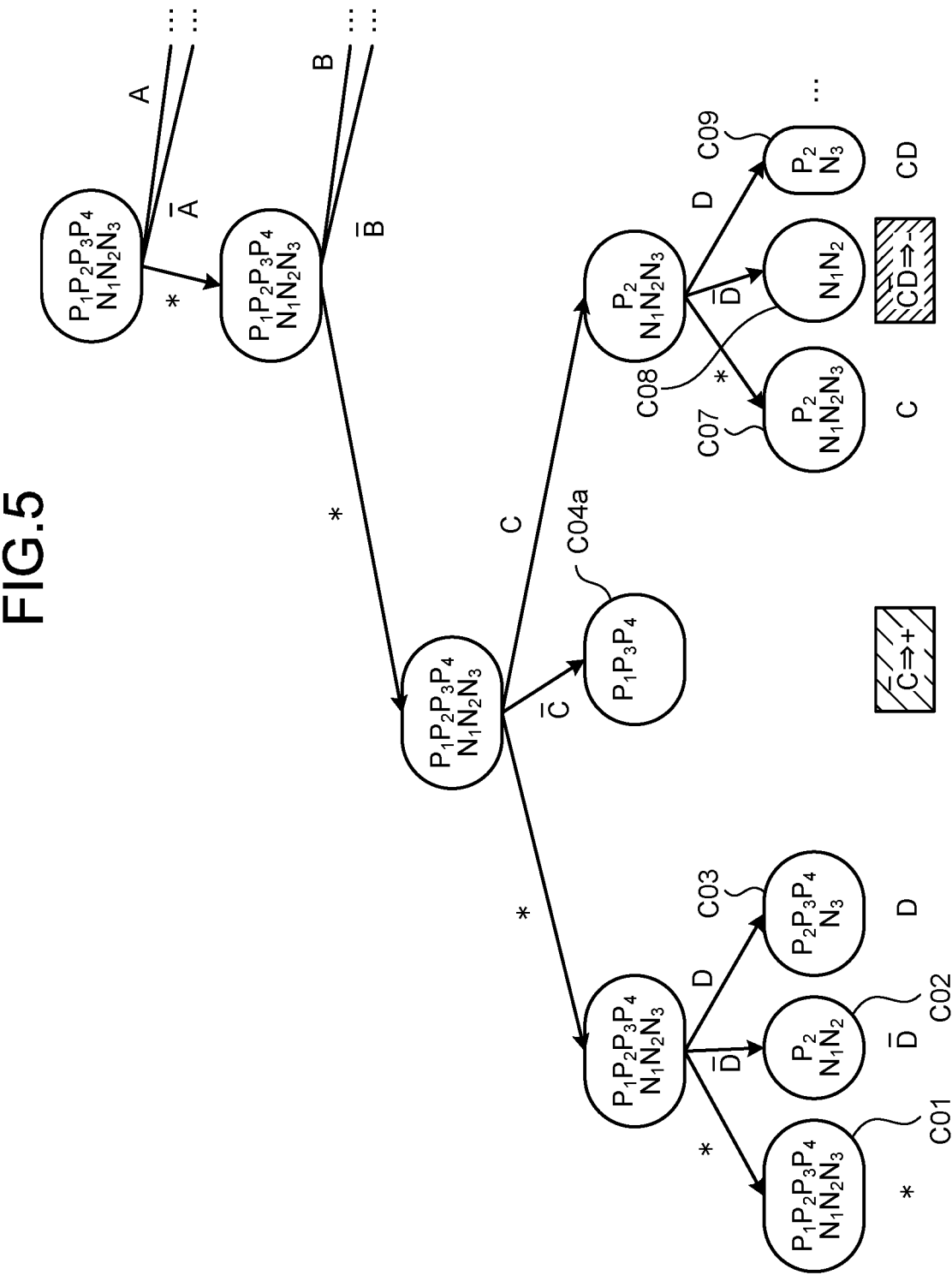
FIG. 5 is an explanatory diagram for explaining the generation of the hypothesis.

FIG. 5 is an explanatory diagram for explaining a generation of a hypothesis. As illustrated in FIG. 5, the hypothesis generation unit 30 is performed so that the combination (combination C05, C06) that is the special case of the C bar is omitted, and a combination C04a of the C bar is left as a hypothesis set.

If it is not the special case (S15: NO), the hypothesis generation unit 30 adds the selected combination to the hypothesis set of hypothesis set data 23 (S16). Next, the hypothesis generation unit 30 determines whether all the combinations listed in S12 have been selected (S17). If there is an unselected combination (S17: NO), the hypothesis generation unit 30 returns to S13.

By repeating S13 to S17, the hypothesis generation unit 30 lists, in the hypothesis set, all the hypotheses that may correctly explain that the prediction is made based on the objective variable of the training data 21.

Figure 6:
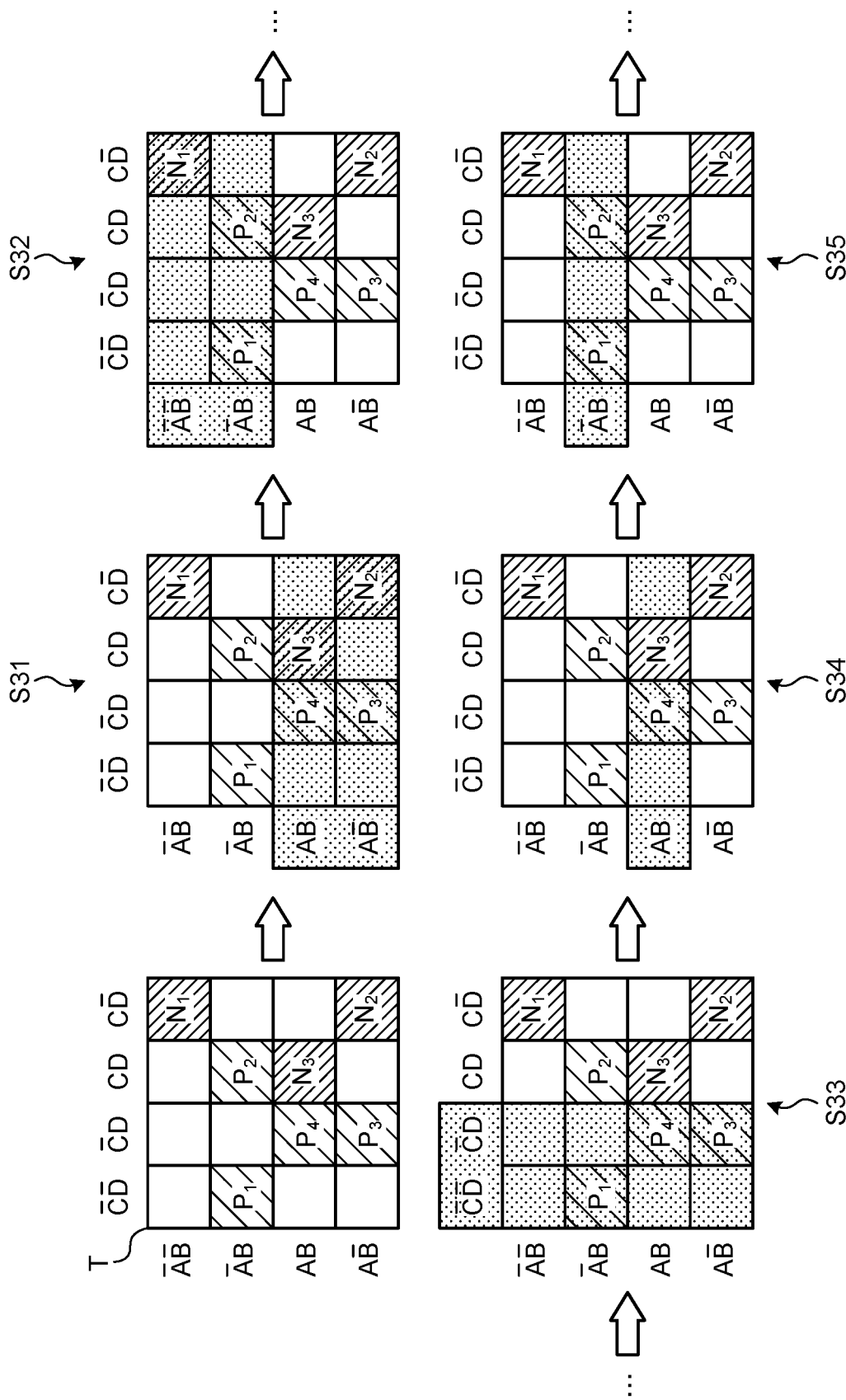
FIG. 6 is an explanatory diagram for explaining the generation of the hypothesis.

FIG. 6 is an explanatory diagram for explaining the generation of the hypothesis, and specifically, a diagram for explaining the contents of FIGS. 4 and 5 using a Carnot diagram example.

As illustrated in FIG. 6, the hypothesis generation unit 30 changes combinations in order of a combination of A (the remaining three explanatory variables are "unused=*") (S31) and a combination of the A bar (the remaining three explanatory variables is "unused-*") (S32) . . . and examines the effective combinations (S31 to S35 . . . ).

Here, the combination of (C bar) in S33 corresponds to the training data ($P_1$, $P_3$, and $P_4$) in which the objective variable is +. That is, in S33, the number or ratio of training data ($P_1$, $P_3$, and $P_4$) classified into the + class is equal to or greater than the predetermined value. Therefore, the combination of (C bar) in S33 is determined to be the effective combination (hypothesis) classified into the + class. Note that in the following processing, a combination in which a literal is added to the (C bar) is excluded.

Next, the hypothesis generation unit 30 examines all combinations in which three explanatory variables are "unused=*" and then starts examining a combination in which two explanatory variables are "unused=*" (S34). Here, the combination of (A bar B) in S35 corresponds to the training data ($P_1$ and $P_2$) in which the objective variable is +. That is, in S35, the number or ratio of training data ($P_1$ and $P_2$) classified into the + class is equal to or greater than the predetermined value. Therefore, the combination of (A bar B) in S35 is determined to be the effective combination (hypothesis) classified into the + class.

Figure 7:
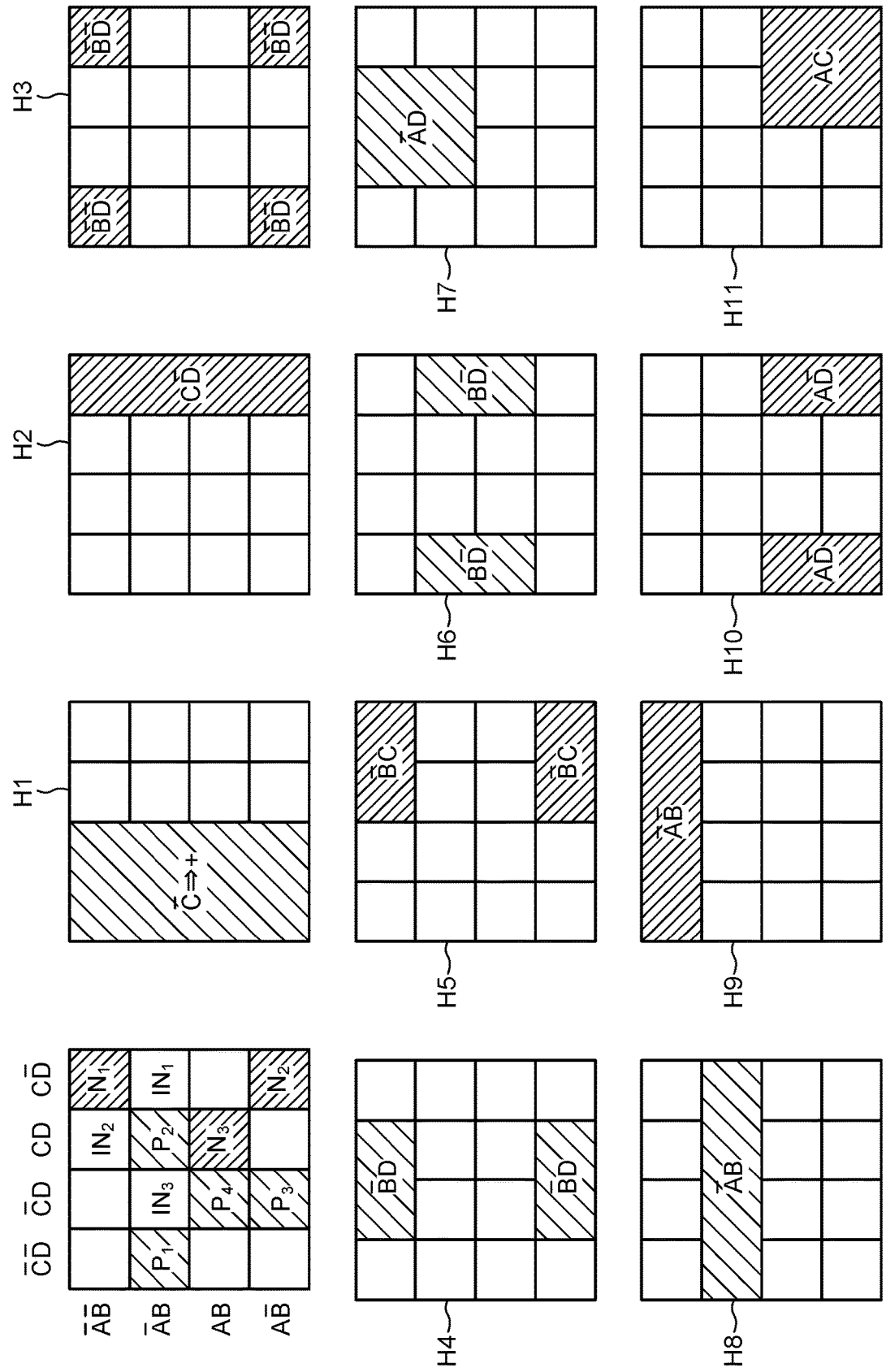
FIG. 7 is an explanatory diagram illustrating an example of the generated hypothesis.

FIG. 7 is an explanatory diagram illustrating an example of the generated hypothesis. As illustrated in FIG. 7, from the training data ($P_1$ to $P_4$ and $N_1$ to $N_3$), hypotheses of hypotheses H1 to H11 in which the classification result is + or − are generated and stored in the storage unit 20 as the hypothesis set data 23.

Each of the hypotheses H1 to H11 is an independent hypothesis based on the requirement that the fact that the classification result of the training data ($P_1$ to $P_4$ and $N_1$ to $N_3$) is + or − is correctly explained. Therefore, mutually inconsistent hypotheses such as the hypothesis H2 and the hypothesis H6 may be included.

In addition, for input data ($IN_1$, $IN_2$, and $IN_3$) not included in the training data ($P_1$ to $P_4$ and $N_1$ to $N_3$), a prediction result can be obtained from a matching hypothesis among the hypotheses H1 to H11.

FIG. 8 is an explanatory diagram for explaining a hypothesis that matches the input data ($IN_1$, $IN_2$, and $IN_3$). As illustrated in FIG. 8, for the input data $IN_1$, CD bar⇒− of the hypothesis H2, BD bar⇒+ of the hypothesis H6, and A bar B=*⇒+ of the hypothesis H8 are matching hypotheses. In addition, for the input data $IN_2$, B bar D⇒+ of the hypothesis H4, B bar C⇒− of the hypothesis H5, A bar D⇒+ of the hypothesis H7, and A bar B⇒− of the hypothesis H9 are matching hypotheses. In addition, for the input data $IN_3$, C bar⇒+ of the hypothesis H1, A bar D⇒+ of the hypothesis H7, and A bar B⇒+ of the hypothesis H8 are matching hypotheses.

Referring back to FIG. 2, when there is no unselected combination (S17: YES), the learning unit 40 calculates weights of each hypothesis H1 to H11 based on whether or not each hypothesis (H1 to H11) included in the hypothesis set of hypothesis set data 23 for each of the training data ($P_1$ to $P_4$ and $N_1$ to $N_3$) is established (S18). Next, the learning unit 40 stores, as the weight data 24, the calculation result in the storage unit 20.

The weight calculation in the learning unit 40 may be any of the following three methods, for example.

All rules (H1 to H11) are set to weight 1 (majority decision based on the number of rules).
Weights are set based on the number of training data ($P_1$ to $P_4$ and $N_1$ to $N_3$) that support (correspond to) rules (H1 to H11).

Weighting by logistic regression to which training data ($P_1$ to $P_4$ and $N_1$ to $N_3$) is applied is performed.

Figure 9:
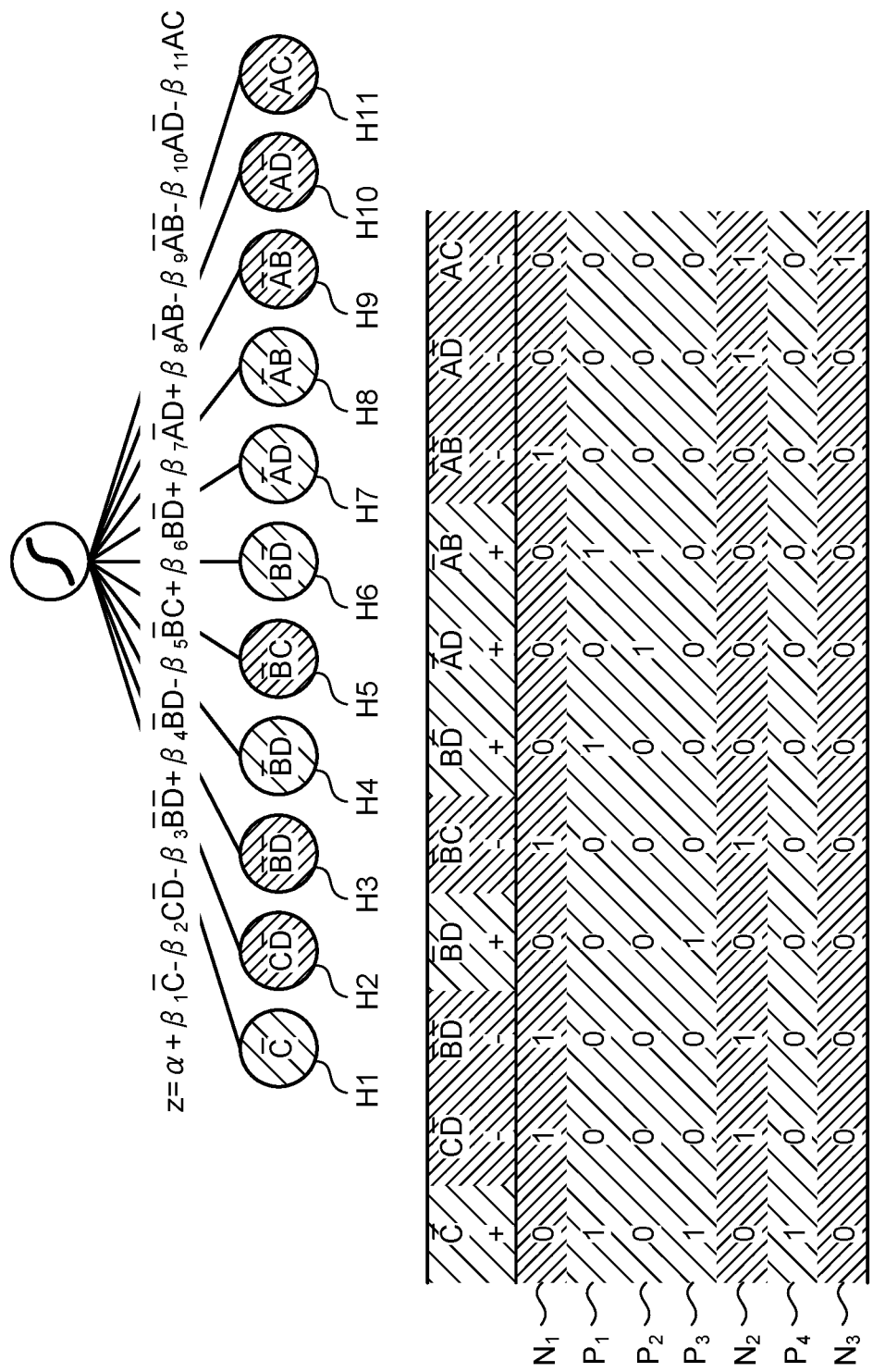
FIG. 9 is an explanatory diagram for explaining weighting by logistic regression.

FIG. 9 is an explanatory diagram for explaining the weighting by the logistic regression. In the logistic regression, as illustrated in FIG. 9, training data ($P_1$ to $P_4$ and $N_1$ to $N_3$) are applied to a model formula to obtain weights ($\beta_1$ to $\beta_{11}$) of the hypotheses H1 to H11. This model formula corresponds to, for example, a score function that obtains a prediction score.

Here, the learning unit 40 may select a hypothesis according to the weights of each hypothesis (H1 to H11) obtained by the logistic regression or the like.

Figure 10:
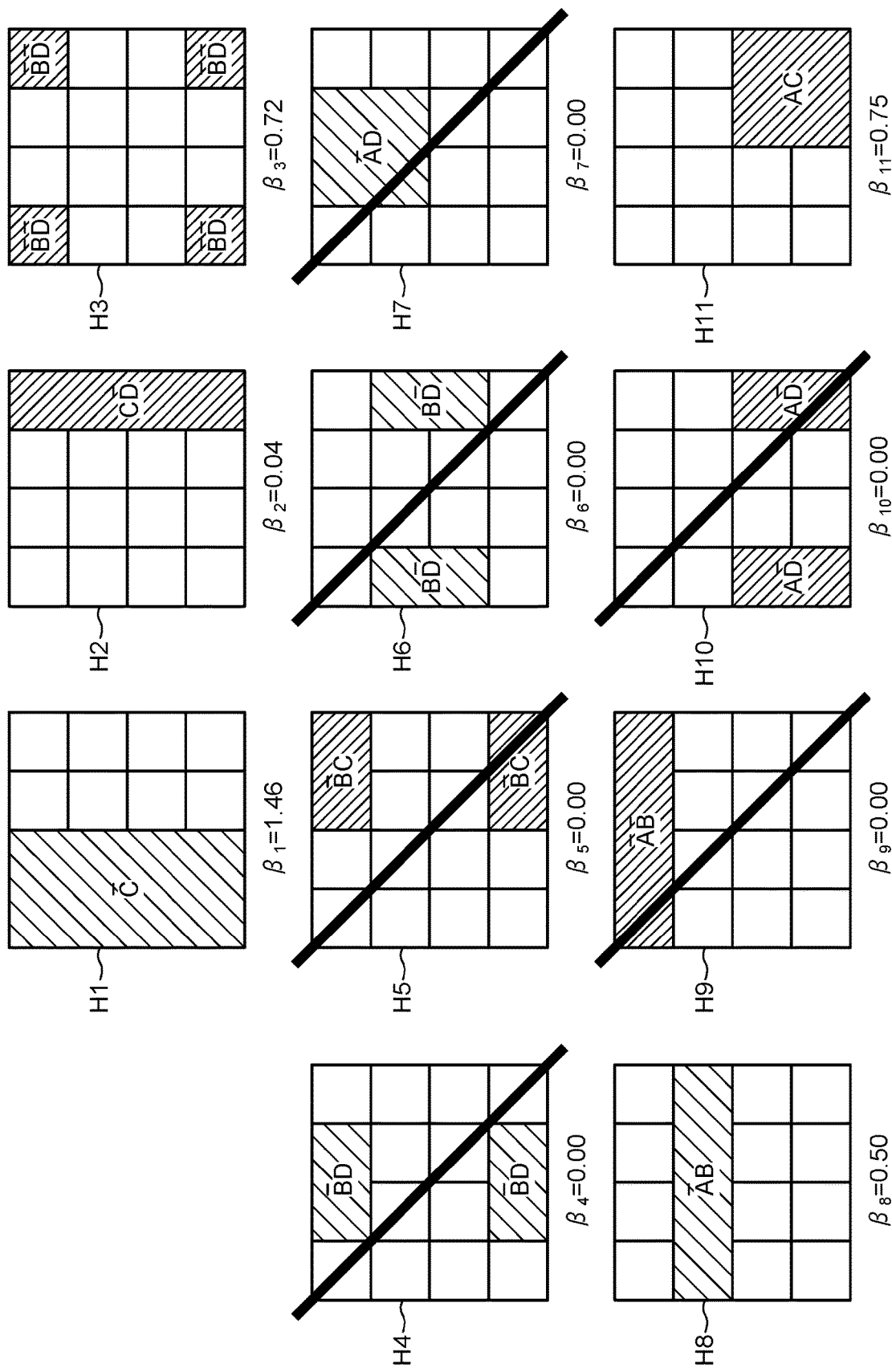
FIG. 10 is an explanatory diagram for explaining a selection of a hypothesis.

FIG. 10 is an explanatory diagram for explaining a selection of a hypothesis. As illustrated in FIG. 10, the learning unit 40 selects a major hypothesis that has a weight equal to or greater than a predetermined value and has a large influence on the prediction result, based on the weights ($\beta_1$ to $\beta_{11}$) of the hypotheses H1 to H11. In the illustrated example, five hypotheses H1 to H3, H8, and H11 that have a weight of 0 and are C bar, CD bar, B bar D bar, A bar B, and AC are selected as main hypotheses.

Referring back to FIG. 2, the operation at the time of prediction (S2) will be described. If S2 is started, the input unit 10 receives the input data 22 to be predicted and stores the received input data 22 in the storage unit 20 (321).

Next, the prediction unit 50 is data obtained by aggregating each hypothesis listed in the hypothesis set according to a predetermined order condition (for example, process order) based on the hypothesis set data 23, and generates the tree structure data that includes the attribute value (explanatory variable value) as the branch (S22).

Figure 11:
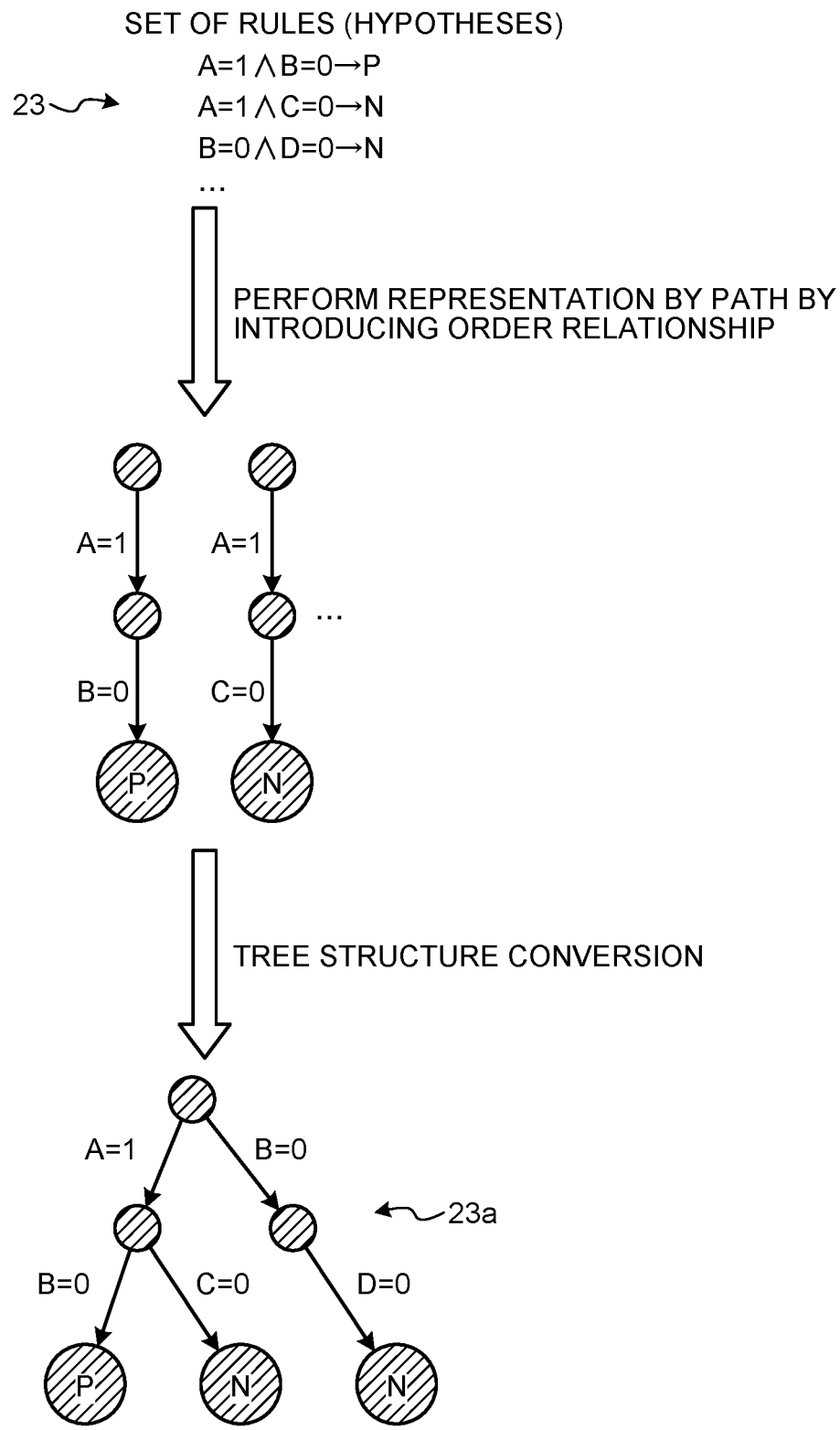
FIG. 11 is an explanatory diagram for explaining a generation of tree structure data.

FIG. 11 is an explanatory diagram for explaining the generation of the tree structure data. As illustrated in FIG. 11, the hypothesis set data 23 has a set of rules (hypotheses) such as $A=1 \wedge B=0 \rightarrow P$, $A=1 \wedge C=0 \rightarrow N$, $B=0 \wedge D=0 \rightarrow N$ ... for a correspondence between the explanatory variables A, B, C ... and label (P·N) The prediction unit 50 introduces an order relationship ($A=1 \rightarrow B=1 \rightarrow P$) based on the order condition ($A \rightarrow B \rightarrow C \rightarrow$ ...) for each hypothesis included in the hypothesis set data 23, and therefore represents each hypothesis by a path. Next, the prediction unit 50 connects the paths of each hypothesis in order from an attribute value close to a root and aggregates common parts, thereby generating the tree structure data 23a in which the attribute value is converted into the tree structure as the branch.

Next, the prediction unit 50 performs pruning by applying the known attribute value included in the input data 22 to the tree structure data 23a and then obtains a likelihood of obtaining the value of the predetermined label for the unknown attribute value, thereby determining the degree of contribution to make the attribute value reach the predetermined label (S23). The prediction unit 50 stores the prediction result by the determination of the degree of contribution in the storage unit 20 as the result data 25.

Figure 12A:
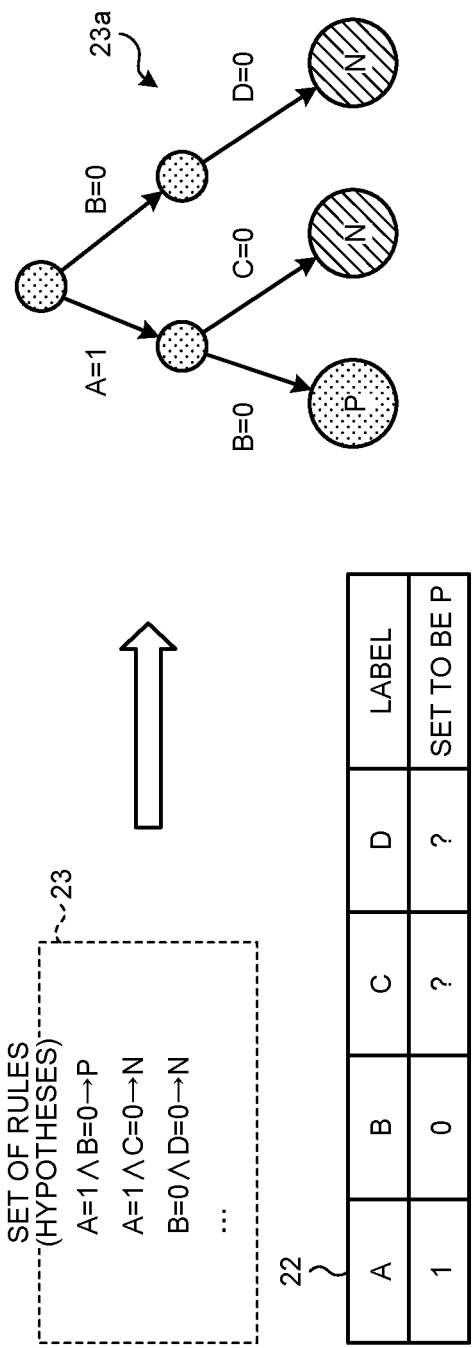
FIG. 12A is an explanatory diagram for explaining a calculation example of a likelihood of obtaining a value of a predetermined label.
Figure 12B:
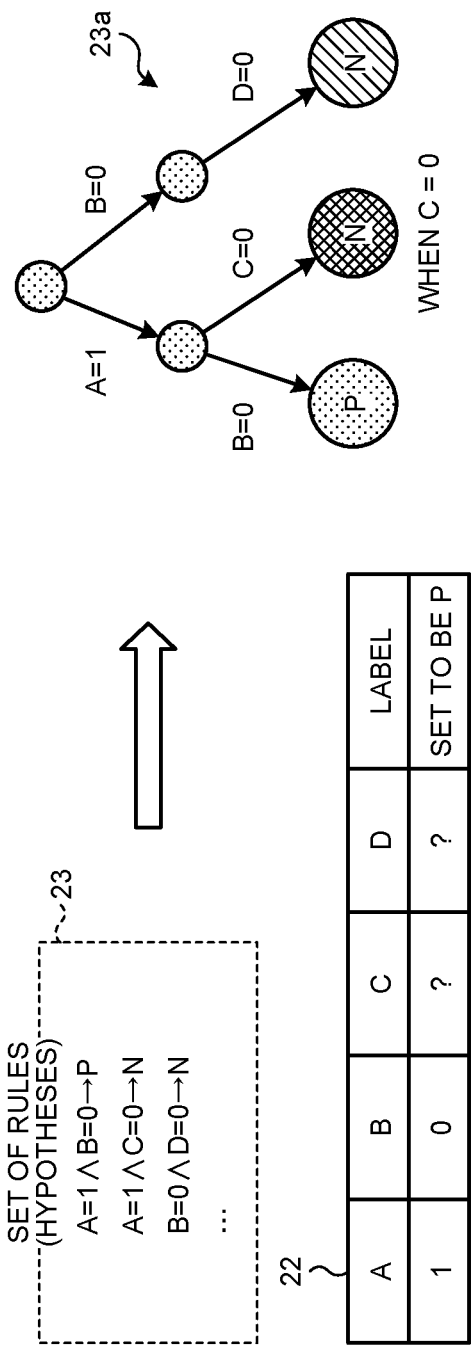
FIG. 12B is an explanatory diagram for explaining the calculation example of the likelihood of obtaining the value of the predetermined label.
Figure 12C:
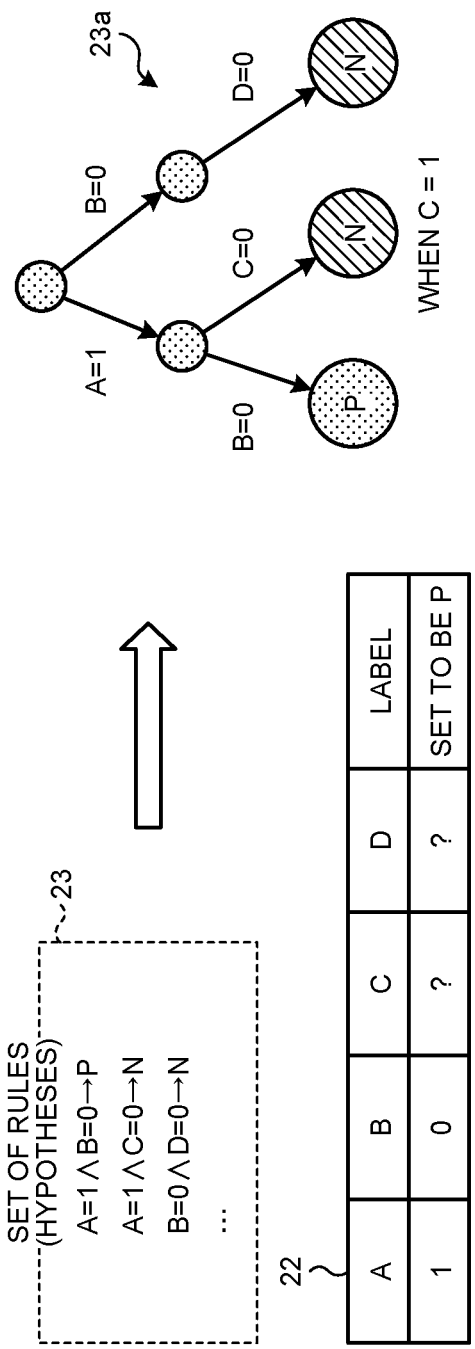
FIG. 12C is an explanatory diagram for explaining the calculation example of the likelihood of obtaining the value of the predetermined label.

FIGS. 12A to 12C are explanatory diagrams for explaining the calculation example of the likelihood of obtaining the value of the predetermined label. As illustrated in FIG. 12A, it is assumed that the tree structure data 23a having the attribute values of A, B, C, and D as branches is obtained by the hypothesis set data 23 such as $A=1 \wedge B=0 \rightarrow P$, $A=1 \wedge C=0 \rightarrow N$, $B=0 \wedge D=0 \rightarrow N$ .... In addition, it is also assumed that the input data 22 includes the known action (a part of the explanatory variable) in which A=1 and B=0 and a targeted label (P). Therefore, it is assumed that the prediction unit 50 performs pruning with A=1 and B=0 in the tree structure in the tree structure data 23a, and treats that the search for the branches A and B is completed (determined).

As illustrated in FIG. 12B, the prediction unit 50 calculates a likelihood of obtaining the value of the label P or N by tracing the path of the tree structure in the tree structure data 23a when the unknown attribute value C is determined to be C=0.

For example, for the label P, it is found that the path (rule) of $A=1 \rightarrow B=0 \rightarrow P$ is established when C=0. In addition, for the label N, it is found that the path (rule) of $A=1 \rightarrow C=0 \rightarrow N$ is established when C=0. The paths (rules) of B=0 and D=0 are undetermined by D after C, but are found to be likely to be established as the label N when C=0.

The prediction unit 50 obtains the likelihood of obtaining the value of the label P or N when C=0 based on the number (including those that can also be established) where P or N is established when C=0 with respect to the total number of paths (rules). In addition, the prediction unit 50 may obtain the likelihood of obtaining the value of the label P or N when C=0 by weighting the score function to a path (rule) where P or N is established.

In addition, as illustrated in FIG. 12C, the prediction unit 50 calculates a likelihood of obtaining the value of the label P or N by tracing the path of the tree structure in the tree structure data 23a when the unknown attribute value C is determined to be C=1.

For example, for the label P, it is found that the path (rule) of $A=1 \rightarrow B=0 \rightarrow P$ is established when C=1. In addition, for the label N, it is found that the paths (rules) of B=0 and D=0 are likely to be established when C=1.

The prediction unit 50 obtains the likelihood of obtaining the value of the label P or N when C=1 based on the number (including those that can also be established) where P or N is established when C=1 with respect to the total number of paths (rules). In addition, the prediction unit 50 may obtain the likelihood of obtaining the value of the label P or N when C=1 by weighting the score function to the path (rule) where P or N is established.

FIG. 13 is an explanatory diagram illustrating the degree of contribution. As illustrated in FIG. 13, a case 71 exemplifies a case where C=0, and the number of rules satisfying P is 1 and the number of rules satisfying N is 1. Further, the number of rules that is likely (possible) to satisfy P is 0, and the number of rules that is likely (possible) to satisfy N is 1. Therefore, the prediction unit 50 calculates a likelihood where the value of the label N can be obtained higher than that of the label P when C=0.

In addition, a case 72 exemplifies a case where C=1, and the number of rules satisfying P is 1 and the number of rules satisfying N is 0. Further, the number of rules that is likely (possible) to satisfy P is 0, and the number of rules that is likely (possible) to satisfy N is 1. Therefore, the prediction unit 50 calculates a likelihood where the value of the label P can be obtained higher than that of the label N when C=1.

The prediction unit 50 compares the cases 71 and 72 (for example, compares likelihoods with P) to obtain C=1 where the likelihood with P becomes higher as a prediction result. Further, the prediction unit 50 may determine the degree of contribution of the attribute value C to the value of the label P, for example, based on the difference between the likelihood of obtaining the value of the label P when C=0 and the likelihood of obtaining the value of the label P when C=1. For example, the case where when C=0, the number of rules that is likely (possible) to satisfy P is 0, and when C=1, the number of rules that is likely (possible) to satisfy P is 1 is a first case. In addition, the case where when C=0, the number of rules that is likely (possible) to satisfy P is 0, and when C=1, the number of rules that is likely (possible) to satisfy P is 2 is a second case. Comparing the first case with the second case, when C=1, the number of (possible) rules that is likely (possible) to satisfy P increases by 1 in the first case and increases by 2 in the second case, contrary to the case when C=0. In this case, the prediction unit 50 may determine that the attribute value of C=1 in the second case contributes more to the value of the label P than the attribute value of C=1 in the first case. Alternatively, the prediction unit 50 may determine that the contribution to the value of the label P is large by the attribute value in which the difference between the number of rules that is likely (possible) to satisfy P when the attribute value is 0 and 1 is large among the plurality of attribute values.

Figure 14A:
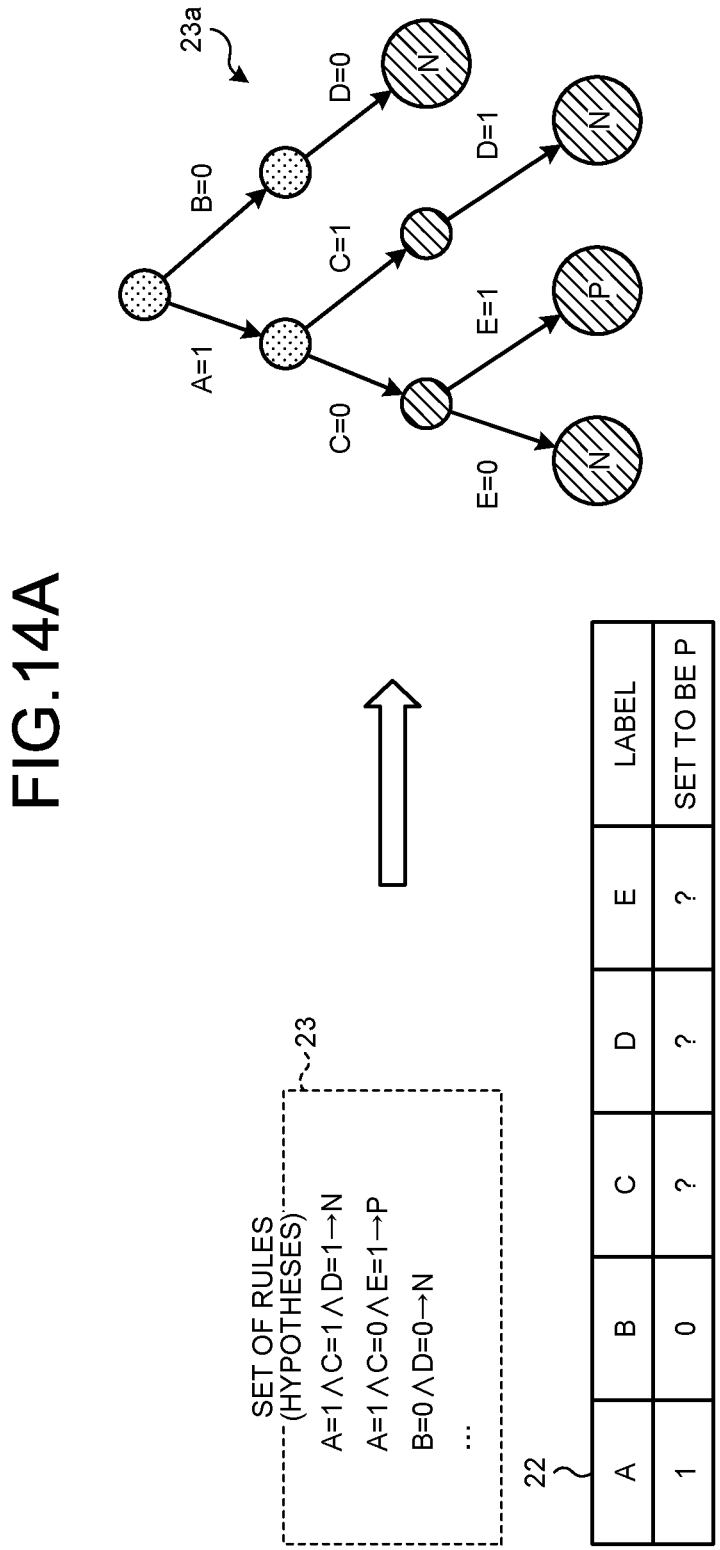
FIG. 14A is an explanatory diagram for explaining the calculation example of the likelihood of obtaining the value of the predetermined label.
Figure 14B:
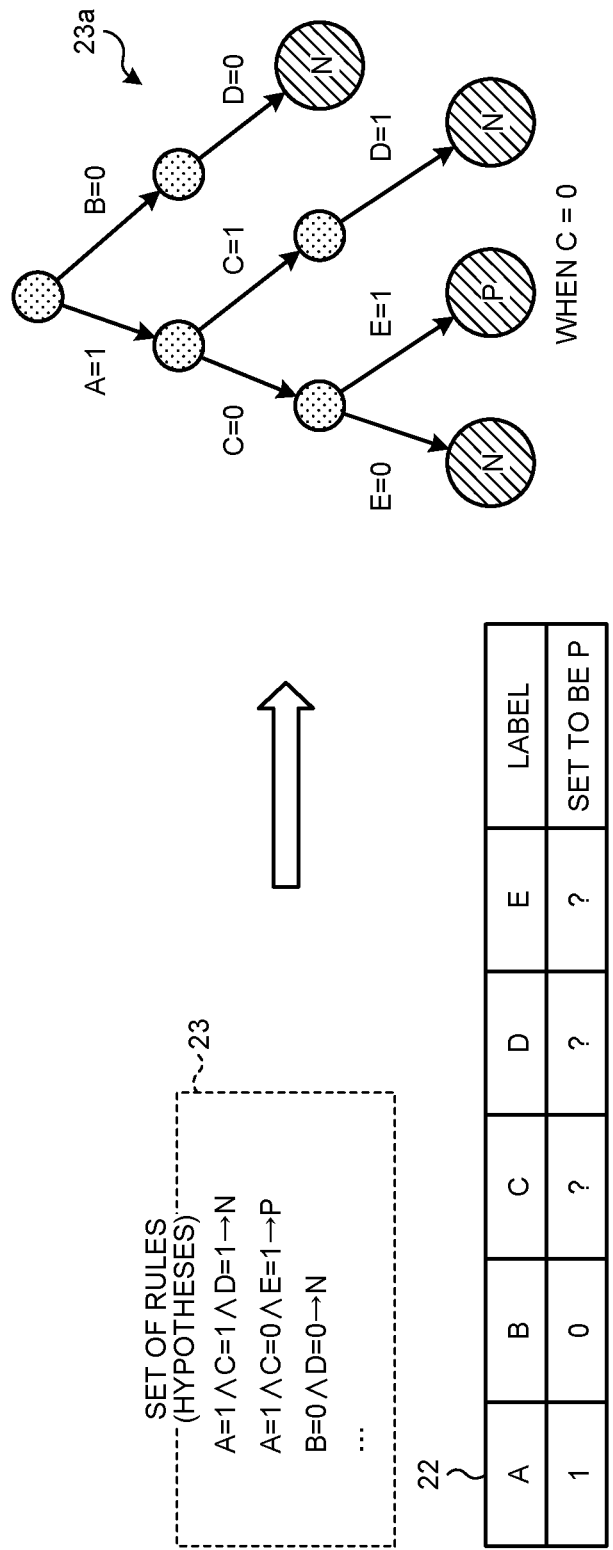
FIG. 14B is an explanatory diagram fox explaining the calculation example of the likelihood of obtaining the value of the predetermined label.
Figure 14C:
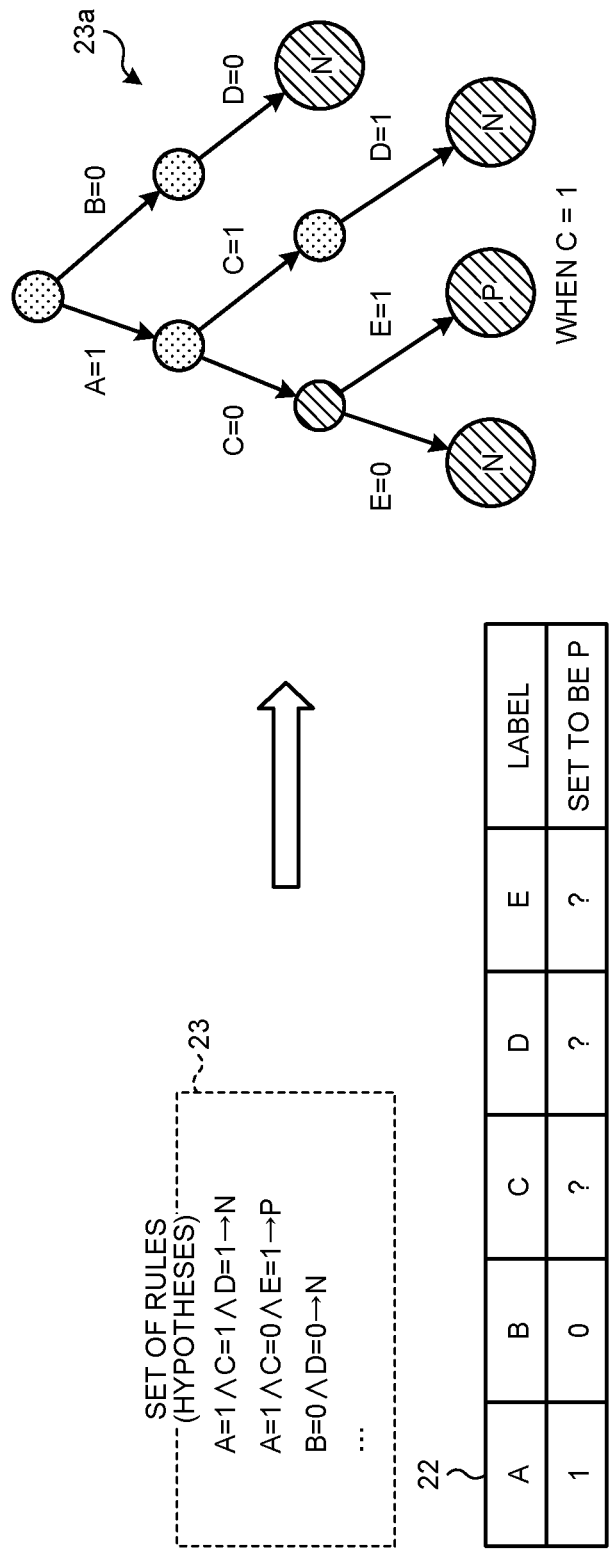
FIG. 14C is an explanatory diagram for explaining the calculation example of the likelihood of obtaining the value of the predetermined label.

FIGS. 14A to 14C are explanatory diagrams for explaining the calculation example of the likelihood of obtaining the value of the predetermined label. The examples of FIGS. 14A to 14C illustrate cases where variables more increase more than those illustrated in FIGS. 12A to 12C.

Specifically, it is assumed that the tree structure data 23*a* having the attribute values of A, B, C, D, and E as branches is obtained by the hypothesis set data 23 such as A=1∧C=0∧D=1→N, A=1∧C=0∧E=1→P, B=0∧D=0→N . . . . In addition, it is also assumed that the input data 22 includes the known action (a part of the explanatory variable) in which A=1 and B=0 and a targeted label (P). Therefore, it is assumed that the prediction unit 50 performs pruning with A=1 and B=0 in the tree structure in the tree structure data 23*a*, and treats that the search for the branches A and B is completed (determined).

As illustrated in FIG. 14B, the prediction unit 50 calculates a likelihood of obtaining the value of the label of P or N by tracing the path of the tree structure in the tree structure data 23*a* when the unknown attribute value C is determined to be C=0.

For example, for the label P, it is found that the path (rule) of A=1→C=0→E=1 is likely to be established when C=0. In addition, for the label N, it is found that the paths (rules) of A=1→C=0→E=0 and B=0→D=0 are likely to be established when C=0.

In addition, as illustrated in FIG. 14C, the prediction unit 50 calculates a likelihood of obtaining the value of the label P or N by tracing the path of the tree structure in the tree structure data 23*a* when the unknown attribute value C is determined to be C=1.

For example, for the label P, one that is established (possible) when C=1 is 0. In addition, for the label N, it is found that the paths (rules) of A=1→C=1→D=1 and B=0→D=0 are likely to be established when C=1.

Accordingly, the prediction unit 50 compares the case of C=0 with the case of C=1 (for example, compares likelihoods with P) to obtain C=0 where the likelihood with P becomes higher as a prediction result.

Referring back to FIG. 2, the output unit 60 reads the result data 25 from the storage unit 20, and outputs the prediction result predicted by the prediction unit 50 by the above processing to the display, the file, or the like (S24). That is, the output unit 60 outputs the action (attribute value) in the unknown attribute (explanatory variable) that becomes the targeted label after performing the known action.

Figure 15:
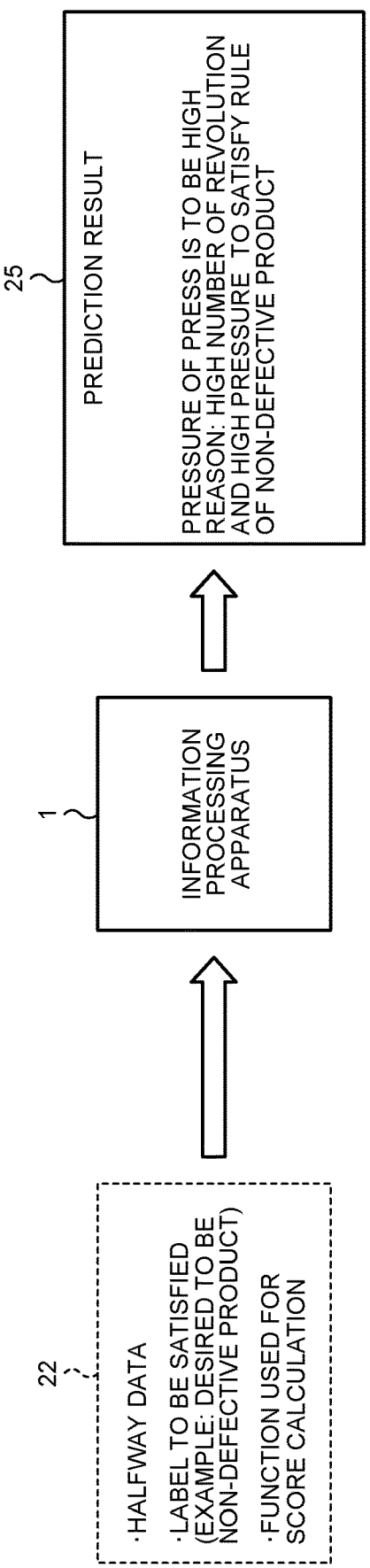
FIG. 15 is an explanatory diagram for explaining an output of a prediction result.

FIG. 15 is an explanatory diagram for explaining the output of the prediction result. As illustrated in FIG. 15, the information processing apparatus 1 receives the input data 22 that includes halfway data (for example, known attribute values obtained halfway through the manufacturing process), a label (non-defective product) to be satisfied, a function used for score calculation, and the like.

For example, for the unknown action in a subsequent manufacturing process, the prediction unit 50 of the information processing apparatus 1 predicts an optimal action (attribute value) that becomes the label to be satisfied after performing the known action indicated by the halfway data. Next, the output unit 60 outputs the optimum action according to the predicted attribute value as the result data 25. Thereby, a user can easily confirm the action that becomes the label (non-defective product) to be satisfied, for example, in the subsequent manufacturing process.

As described above, the information processing apparatus 1 includes the input unit 10 and the prediction unit 50. The input unit 10 receives the input data 22 to be predicted. The prediction unit 50 generates the tree structure data 23*a* that are data obtained by aggregating the plurality of hypotheses according to a predetermined order condition for the plurality of attributes based on the hypothesis set data 23 including the plurality of pieces of rule information (hypotheses) each indicated by the association of a combination of the attribute values of the plurality of attributes with a label and have the attribute values as the branches. In addition, when the attribute value of the predetermined attribute among the plurality of attributes in the tree structure data 23*a* is determined to be a predetermined value based on the input data 22, the prediction unit 50 determines the degree of contribution to make the predetermined value of the predetermined attribute reach the predetermined label based on the likelihood of obtaining the value of the predetermined label as the determination result.

As described above, the information processing apparatus 1 generates the tree structure data 23*a* having the attribute value as the branch according to the predetermined order condition for the plurality of attributes, and obtains the value of the predetermined attribute using the generated tree structure data 23*a*. For this reason, in the information processing apparatus 1, it is possible to efficiently perform prediction by trying an action along the tree structure without performing all (on round robin basis) actions (attributes) based on each of the plurality of classification rules.

In addition, the prediction unit 50 performs pruning by applying the known attribute value included in the input data 22 to the tree structure data 23*a*. The prediction unit 50 determines the degree of contribution to the fact that for the attribute whose attribute value is unknown among the plurality of attributes, the determination result when the unknown attribute value of the attribute is determined to be the predetermined value is the label included in the input data 22. Thereby, the information processing apparatus 1 can efficiently predict the unknown attribute (remaining explanatory variable) based on the known attribute value (a part of the explanatory variable) included in the input data 22 and the label (objective variable).

Further, the prediction unit 50 obtains a degree of contribution to the fact that the determination result when the attribute value of the predetermined attribute is determined to be the first value (for example, C=0) becomes a predetermined label (for example, P). Further, the prediction unit 50 obtains a degree of contribution to the fact that the determination result when the attribute value of the predetermined attribute is determined to be the second value (for example, C=1) becomes a predetermined label (for example, P). Next, the prediction unit 50 compares the degree of contribution when the attribute value of the predetermined attribute is set to the first value with the degree of contribution when the attribute value of the predetermined attribute is set to the second value, and determines whether the predetermined attribute is the first value or the second value. As a result, the information processing apparatus 1 can predict, for example, the attribute value having a higher degree of contribution.

Note that each component of each apparatus illustrated does not necessarily need to be physically configured as illustrated. That is, the specific form of distribution/integration of each apparatus is not limited to those illustrated in the drawings, and all or a part thereof may be functionally or physically distributed/integrated into arbitrary units according to various loads and usage conditions.

Various processing functions performed by the information processing apparatus 1 may be entirely or arbitrarily executed on a CPU (or a microcomputer such as an MPU or a micro controller unit (MCU)). In addition, it goes without saying that various processing functions may be executed in whole or in part on a program analyzed and executed by a CPU (or a microcomputer such as an MPU or an MCU) or hardware by wired logic. In addition, various processing functions performed by the information processing apparatus 1 may be executed by a plurality of computers in cooperation with each other by cloud computing.

Figure 16:
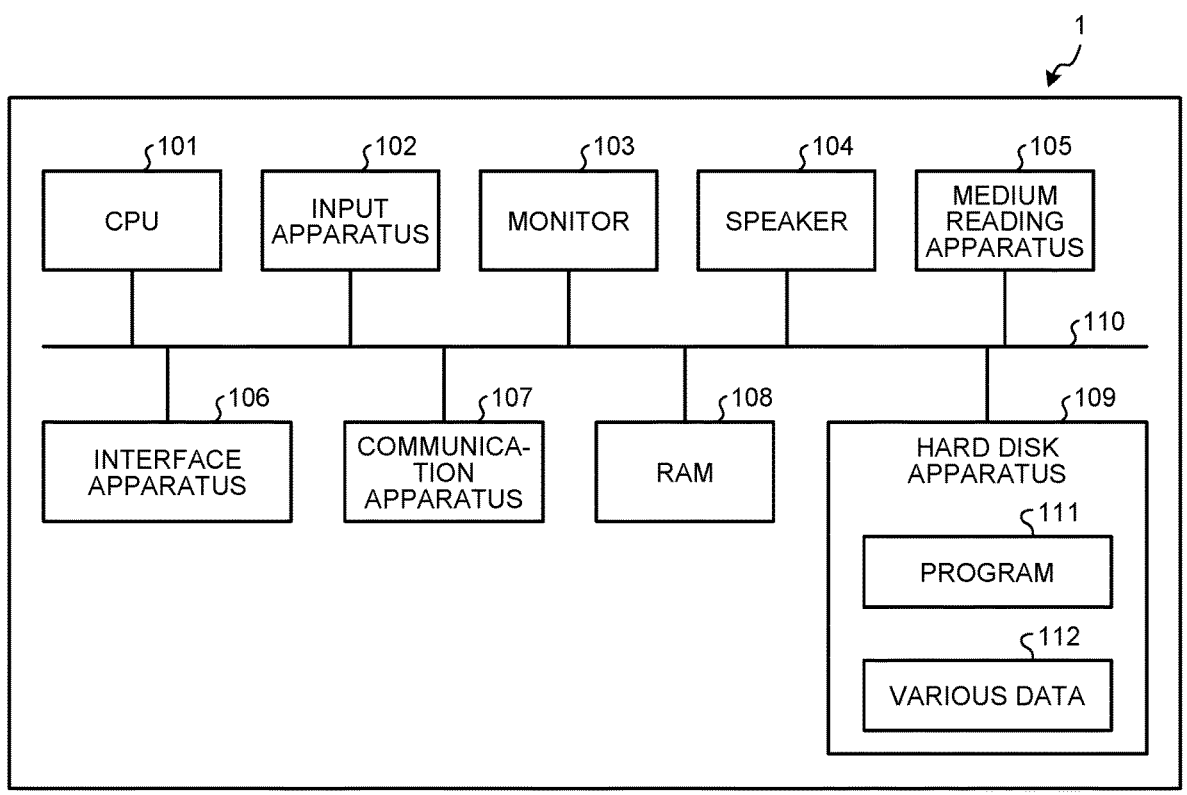
FIG. 16 is an explanatory diagram for explaining a hardware configuration example of an information processing apparatus according to the embodiment.

However, various processes described in the above embodiment can be realized by executing a prepared program by a computer. Therefore, in the following, an example of a computer (hardware) that executes a program having the same function as the above embodiment will be described. FIG. 16 is an explanatory diagram for explaining a hardware configuration example of the information processing apparatus 1 according to the embodiment.

As illustrated in FIG. 16, the information processing apparatus 1 includes a CPU 101 that executes various types of arithmetic processing, an input apparatus 102 that receives data input, a monitor 103, and a speaker 104. Further, the information processing apparatus 1 includes a medium reading apparatus 105 that reads a program or the like from a storage medium, an interface apparatus 106 for connecting to various apparatuses, and a communication apparatus 107 for communication connection to an external apparatus in a wired or wireless manner. Further, the information processing apparatus 1 includes a RAM 108 that temporarily stores various information, and a hard disk apparatus 109. In addition, each unit 101 to 109 in the information processing apparatus 1 is connected to a bus 110.

The hard disk apparatus 109 stores a program 111 for executing various processes described in the above embodiment. In addition, the hard disk apparatus 109 stores various data 112 (for example, training data 21, input data 22, hypothesis set data 23, weight data 24, and result data 25) referred to by the program 111. The input apparatus 102 receives input of operation information from an operator of the information processing apparatus 1, for example. The monitor 103 displays, for example, various screens operated by an operator. The interface apparatus 106 is connected to, for example, a printing apparatus. The communication apparatus 107 is connected to a communication network such as a local area network (LAN), and exchanges various information with external devices via the communication network.

The CPU 101 reads the program 111 stored in the hard disk apparatus 109 and expands the program 111 in the RAM 108, and executes the program to perform various processes related to the input unit 10, the hypothesis generation unit 30, the learning unit 40, the prediction unit 50, and the output unit 60. Note that the program 111 is not stored in the hard disk apparatus 109. For example, the program 111 stored in a storage medium readable by the information processing apparatus 1 may be read and executed by the information processing apparatus 1. The storage medium readable by the information processing apparatus 1 corresponds to, for example, a portable recording medium such as a CD-ROM or a DVD disk, a universal serial bus (USB) memory, a semiconductor memory such as a flash memory, a hard disk drive, or the like. In addition, the program 111 may be stored in apparatuses connected to a public line, the Internet, a LAN, or the like, and the information processing apparatus 1 may read and execute the program from the apparatuses.

According to one embodiment of the present invention, it is possible to efficiently perform the prediction of the input data.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a prediction program that causes a computer to execute a process comprising:

storing in a storage unit a plurality of pieces of rule information that is generated based on training data and is indicated by an association of a combination of an attribute value, from among attribute values, of an attribute, from among a plurality of attributes, with a label, from among labels, so that the plurality of pieces of rule information is usable to obtain a predicted value of a target label for an attribute value, from among the attribute values;

receiving input data including an attribute value of a part of an attribute, from among the plurality of attributes, and a predetermined value of the target label, from among the labels;

generating a tree structure data based on the plurality of pieces of rule information and a predetermined order condition for the plurality of attributes, the tree structure data being obtained by aggregating the plurality of pieces of rule information, the tree structure data including an attribute value, from among the attribute values, as a branch,
the predetermined order condition indicates a process order in a manufacturing process and an attribute value of an attribute indicates an action including an observed value or a controlled setting value in the manufacturing process;

acquiring a likelihood of obtaining the predetermined value of the target label, based on the predetermined order condition for a relationship among the plurality of attributes in the tree structure data, when an attribute value of a predetermined attribute, from among the plurality of attributes, that is other than the part of the attribute in the input data, is set to a certain attribute value;

determining based on the likelihood, when predicting a value of a label for the certain attribute value using the plurality of pieces of rule information, a degree of contribution of the certain attribute value to make the value of the label for the certain attribute value become the predetermined value of the target label;

determining the certain attribute value of the predetermined attribute, based on the degree of contribution, and storing the certain attribute value of the predetermined attribute in the storage unit; and outputting the certain attribute value of the predetermined attribute for the target label.

2. The non-transitory computer-readable recording medium according to claim 1, wherein the determining of the degree of contribution of the certain attribute value of the predetermined attribute includes performing pruning by applying a known attribute value included in the input data to the tree structure data, and determining the degree of contribution of the certain attribute value to which an attribute whose attribute value is unknown is set.

3. The non-transitory computer-readable recording medium according to claim 1, wherein the determining of the degree of contribution of the certain attribute value of the predetermined attribute includes comparing the degree of contribution of a first value of the predetermined attribute with the degree of contribution of a second value of the predetermined attribute, to set the predetermined attribute with the first value or the second value.

4. A prediction method executed by a computer, the prediction method comprising:

storing in a storage unit a plurality of pieces of rule information that is generated based on training data and is indicated by an association of a combination of an attribute value, from among attribute values, of an attribute, from among a plurality of attributes, with a label, from among labels, so that the plurality of pieces of rule information is usable to obtain a predicted value of a target label for an attribute value, from among the attribute values;

receiving input data including an attribute value of a part of an attribute, from among the plurality of attributes, and a predetermined value of the target label, from among the labels;

generating a tree structure data based on the plurality of pieces of rule information and a predetermined order condition for the plurality of attributes, the tree structure data being obtained by aggregating the plurality of pieces of rule information, the tree structure data including an attribute value, from among the attribute values, as a branch, the predetermined order condition indicates a process order in a manufacturing process and an attribute value of an attribute indicates an action including an observed value or a controlled setting value in the manufacturing process;

acquiring a likelihood of obtaining the predetermined value of the target label, based on the predetermined order condition for a relationship among the plurality of attributes in the tree structure data, when an attribute value of a predetermined attribute, from among the plurality of attributes, that is other than the part of the attribute in the input data, is set to a certain attribute value;

determining based on the likelihood, when predicting a value of a label for the certain attribute value using the plurality of pieces of rule information, a degree of contribution of the certain attribute value to make the value of the label for the certain attribute value become the predetermined value of the target label;

determining the certain attribute value of the predetermined attribute, based on the degree of contribution, and storing the certain attribute value of the predetermined attribute in the storage unit; and outputting the certain attribute value of the predetermined attribute for the target label.

5. The prediction method according to claim 4, wherein the determining of the degree of contribution of the certain attribute value of the predetermined attribute includes performing pruning by applying a known attribute value included in the input data to the tree structure data, to determine the degree of contribution of the certain attribute value to which an attribute whose attribute value is unknown is set.

6. The prediction method according to claim 4, wherein the determining of the degree of contribution of the certain attribute value of the predetermined attribute includes comparing the degree of contribution of a first value of the predetermined attribute with the degree of contribution of a second value of the predetermined attribute, to set the predetermined attribute with the first value or the second value.

7. A prediction apparatus comprising:
a processor configured to:

store in a storage unit a plurality of pieces of rule information that is generated based on training data and is indicated by an association of a combination of an attribute value, from among attribute values, of an attribute, from among a plurality of attributes, with a label, from among labels, so that the plurality of pieces of rule information is usable to obtain a predicted value of a target label for an attribute value, from among the attribute values;

receive input data including an attribute value of a part of an attribute, from among the plurality of attributes, and a predetermined value of the target label, from among the labels;

generate a tree structure data based on the plurality of pieces of rule information and a predetermined order condition for the plurality of attributes, the tree structure data being obtained by aggregating the plurality of pieces of rule information, the tree structure data including an attribute value, from among the attribute values, as a branch, the predetermined order condition indicates a process order in a manufacturing process and an attribute value of an attribute indicates an action including an observed value or a controlled setting value in the manufacturing process;

acquire a likelihood of obtaining the predetermined value of the target label, based on the predetermined order condition for a relationship among the plurality of attributes in the tree structure data, when an attribute value of a predetermined attribute, from among the plurality of attributes, that is other than the part of the attribute in the input data, is set to a certain attribute value;

determine based on the likelihood, when predicting a value of a label for the certain attribute value using the plurality of pieces of rule information, a degree of contribution of the certain attribute value to make the value of the label for the certain attribute value become the predetermined value of the target label;

determine the certain attribute value of the predetermined attribute based on the degree of contribution, and store the certain attribute value of the predetermined attribute in the storage unit; and output the certain attribute value of the predetermined attribute for the target label.

8. The prediction apparatus according to claim 7, wherein the processor is further configured to perform pruning by applying a known attribute value included in the input data to the tree structure data to determine the degree of contribution of the certain attribute value to which an attribute whose attribute value is unknown is set.

9. The prediction apparatus according to claim 7, wherein the processor is further configured to compare the degree of contribution of a first value of the predetermined attribute with the degree of contribution of a second value of the predetermined attribute, to set the predetermined attribute with the first value or the second value for the target label.

\* \* \* \* \*